(12) United States Patent  
Hori (10) Patent No.: US 6,640,778 B1
(45) Date of Patent: Nov. 4, 2003

(54) CONTROLLED VARIABLE COMPUTING APPARATUS FOR INTERNAL COMBUSTION ENGINE

(75) Inventor: Yasuyoshi Hori, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/288,526

(22) Filed: Nov. 6, 2002

(30) Foreign Application Priority Data

Jul. 15, 2002 (JP) .................................. 2002-205254

(51) Int. Cl.[7] .................................................. F02P 5/15
(52) U.S. Cl. ................... 123/406.62; 123/476; 701/105
(58) Field of Search ............................ 123/406.62, 476; 701/105

(56) References Cited

U.S. PATENT DOCUMENTS 4,379,332 A * 4/1983 Busser et al. ............... 701/105
4,379,333 A * 4/1983 Ninomiya et al. .......... 701/105
5,668,727 A * 9/1997 Pellerito et al. ............ 701/105

FOREIGN PATENT DOCUMENTS

JP          08-246942          9/1996

* cited by examiner

*Primary Examiner*—Erick Solis
(74) *Attorney, Agent, or Firm*—Sughrue Mion, PLLC (57) ABSTRACT

Controlled variable computing apparatus for an internal combustion engine 101 includes, a revolution signal generating unit 111, 112, 121, 122 for outputting a revolution signal in synchronism with revolution of the internal combustion engine and a control unit 150 for computing a controlled variable for a control target time the revolution signal is inputted, in which the control unit 150 includes, a controlled variable computing unit for computing a driving timing and a driving time period for the control target, and a driving control unit for controlling the driving of the control target each time the revolution signal is inputted, in which if the operation time period of the controlled variable computing unit overlaps the operation time period of the driving control unit, the driving control unit is prioritized to perform its operation by suspending an operation of the controlled variable computing unit.

9 Claims, 11 Drawing Sheets

CONTROLLED VARIABLE COMPUTING APPARATUS FOR INTERNAL COMBUSTION ENGINE

BACKGROUND OF THE INVENTION

1. Field of the Invention

The present invention relates to a controlled variable computing apparatus for an internal combustion engine that computes controlled variables, such as a fuel injection amount and an ignition timing, for each cylinder of a multi-cylinder internal combustion engine using a signal synchronized with the revolution of the internal combustion engine as a trigger.

2. Description of the Related Art

In general, it is required to optimally control a fuel injection amount, an ignition timing, and the like in accordance with an operating condition of an internal combustion engine such as an engine for an automobile. Therefore, there is provided a control unit (ECU) that uses a microcomputer.

This control unit stores a control program, in which there is described a processing routine for computing various kinds of controlled variables. These various kinds of controlled variables are computed in accordance with the stored control program and the control unit performs control based on the controlled variables.

This control program is mainly constructed from a main routine synchronized with an operating clock of the microcomputer and an interruption routine whose execution is triggered by a signal synchronized with the revolution of the internal combustion engine.

In order to appropriately compute the various kinds of controlled variables in accordance with the changing of the operating condition of the internal combustion engine, there are computed appropriate controlled variables if the computation is performed by the interruption routine that is executed in synchronism with the revolution of the internal combustion engine. Also, if a time interval between synchronized signals is shortened in accordance with the increase of the number of revolutions, the number of times of the computation is increased.

With a conventional technique, a signal synchronized with the revolution of the internal combustion engine is generated with a frequency with which the signal is generated around four times each time a crank makes one rotation.

In order to improve the accuracy of the fuel injection amount, the ignition timing, and the like, the frequency of generation of this signal is increased. For instance, the signal is generated each time the crank shaft rotates by a crank angle of 10° and the control of a fuel injection valve, an ignition coil, and the like is performed using this signal. In this case, the time interval between signals synchronized with the revolution of the internal combustion engine is shortened in comparison with a conventional case and there is a danger that a time period taken to perform the processing in the interruption routine that is triggered by each signal exceeds a time period between preceding and succeeding signals.

Accordingly, even if the frequency of computation is increased, it is required to refrain from the execution of processing in the next main routine or processing in the next interruption routine until the processing in the interruption routine corresponding to one signal is ended. Consequently, it is impossible to realize control with good responsiveness that is synchronized with the revolution of the internal combustion engine.

In such a case, there may be conceived a method with which a processing routine is appropriately distributed so that it becomes possible to execute this processing routine between respective signals. In this case, however, there is apprehension that the control program becomes complicated. There may also be conceived a method with which the computation capability of the control unit is enhanced. However, there is apprehension that this method is disadvantageous from the viewpoint of cost. Consequently, it is required to perform the computation of controlled variables with efficiency.

In the case of a conventional controlled variable computing apparatus for an internal combustion engine that is, for instance, disclosed in JP 08-246942 A, one of a plurality of cylinders is determined as a reference cylinder, various kinds of controlled variables for this reference cylinder are computed in a main routine synchronized with an operating clock of a microcomputer, and results of this computation are set as basic controlled variables. In addition, as to the controlled variables for respective cylinders, computation for correcting these basic controlled variables is performed in an interruption routine that is triggered by a cylinder detection signal corresponding to each cylinder and there are calculated ultimate controlled variables.

With the conventional controlled variable computing apparatus for an internal combustion engine, as described above, the basic controlled variables for the reference cylinder are computed in the main routine synchronized with the operating clock of the microcomputer, so that there is a problem that it is difficult to cope with a sudden change of an operating state of the internal combustion engine.

SUMMARY OF THE INVENTION

The present invention has been made to solve the problems described above, and it is an object of the invention to provide a controlled variable computing apparatus for an internal combustion engine that is capable of appropriately controlling a fuel injection amount, an ignition timing, and the like in accordance with an operating state.

A controlled variable computing apparatus for an internal combustion engine according to the present invention includes, a revolution signal generating unit for outputting a revolution signal in synchronism with revolution of the internal combustion engine, and a control unit for computing a controlled variable for a control target each time the revolution signal is inputted. The control unit includes, a controlled variable computing unit for computing a driving timing and a driving time period for the control target at a point in time when the number of times of input of the revolution signal reaches a predetermined number, and a driving control unit for controlling the driving of the control target based on the driving timing and the driving time period each time the revolution signal is inputted, in which if the operation time period of the controlled variable computing unit overlaps the operation time period of the driving control unit, the driving control unit is prioritized to perform its operation by suspending an operation of the controlled variable computing unit.

With this construction, it becomes unnecessary to complete an operation of the controlled variable computing unit within a time period between signals synchronized with the revolution, there is not hindered an operation of the driving control unit, and it becomes possible to carry out control with good responsiveness while preventing a situation where a control program is complicated.

DETAILED DESCRIPTION OF THE PREFERRED EMBODIMENTS

First Embodiment

A first embodiment of the present invention will be described in detail below with reference to the drawings.

Figure 1:
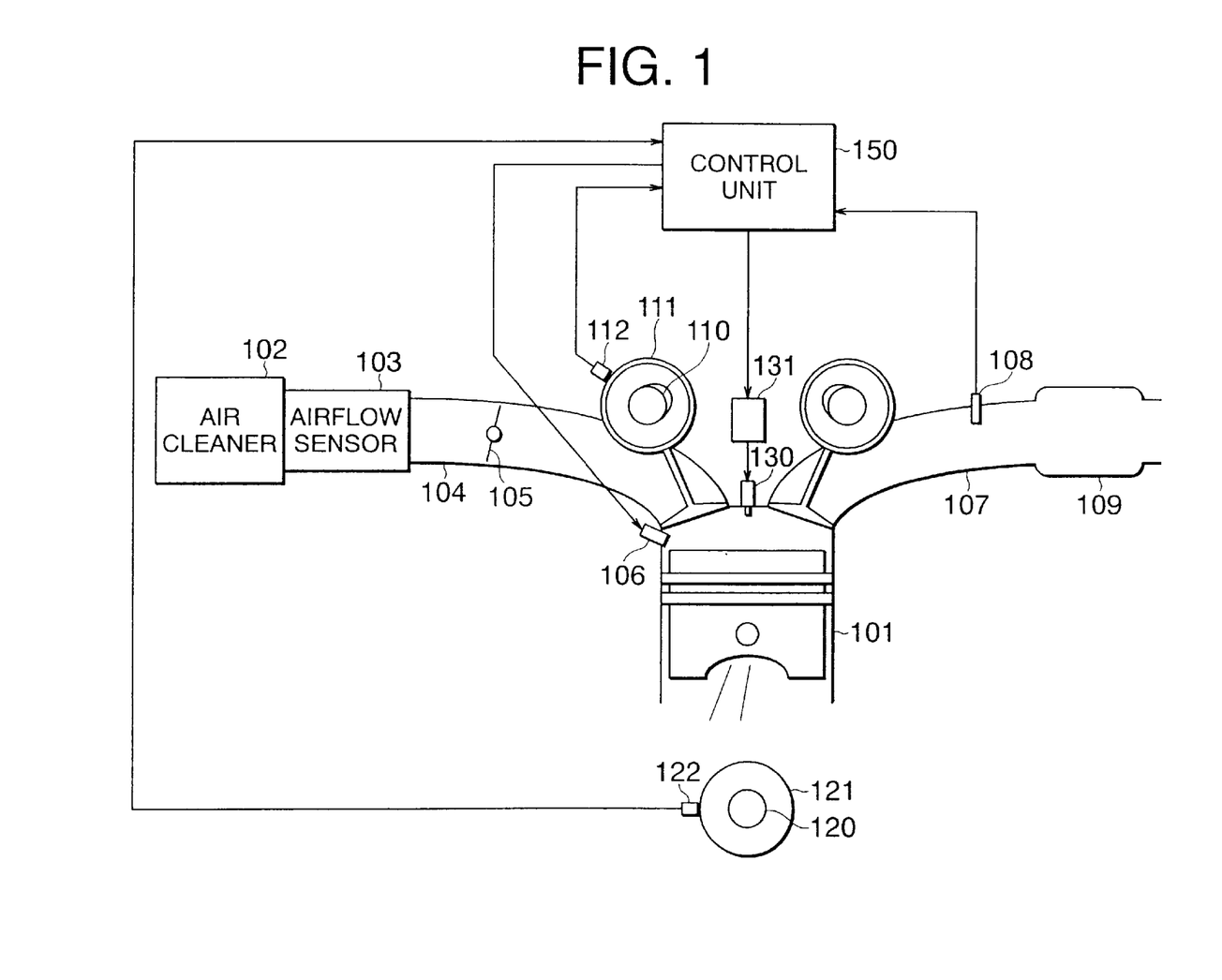
FIG. 1 is a construction drawing showing a four-cylinder internal combustion engine in a first embodiment of the present invention.
Figure 2:
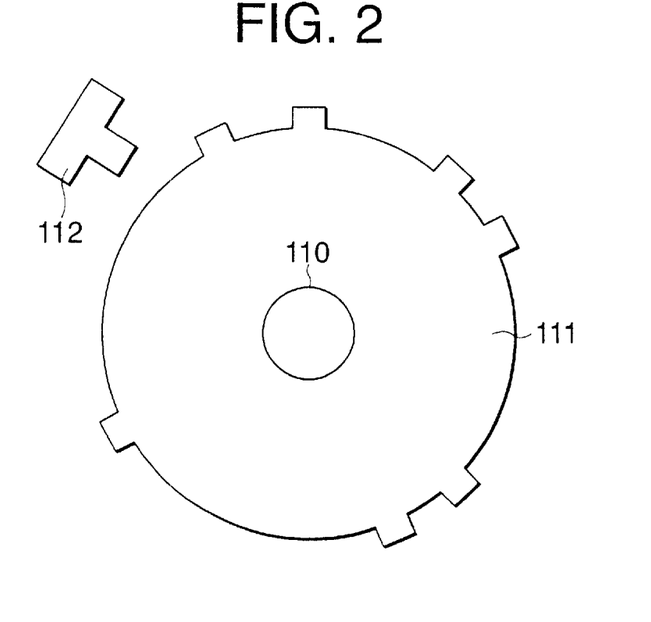
FIG. 2 is a construction drawing showing the shape of a signal plate of a cam shaft.
Figure 3:
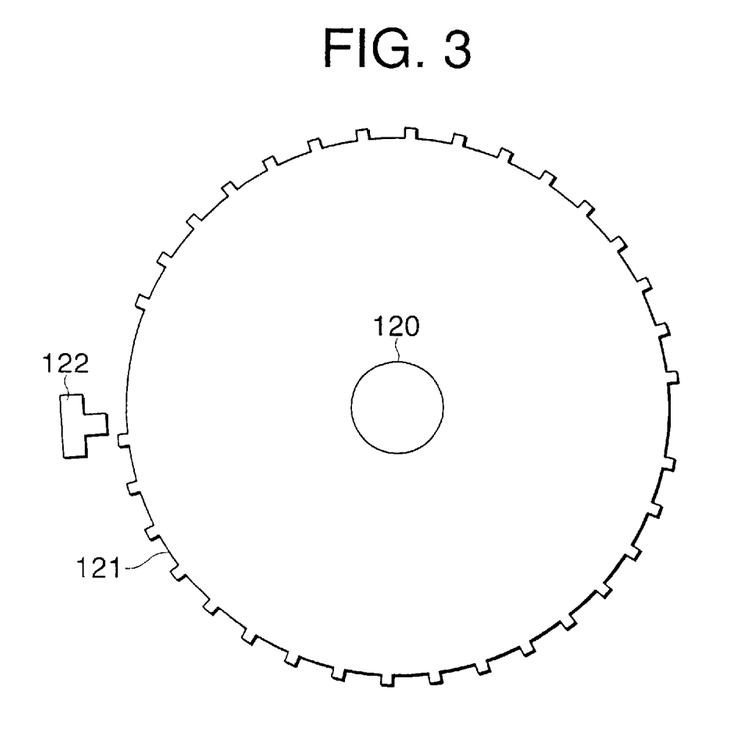
FIG. 3 is a construction drawing showing the shape of a signal plate of a crank shaft.

FIG. 1 is a construction drawing showing a four-cylinder internal combustion engine in the first embodiment of the present invention. FIG. 2 is a construction drawing showing the shape of a signal plate of a cam shaft. FIG. 3 is a construction drawing showing the shape of a signal plate of a crank shaft.

In FIG. 1, an internal combustion engine 101 is provided with an air cleaner 102 for cleaning intake air into the internal combustion engine 101, an airflow sensor 103 for measuring the amount of intake air into the internal combustion engine 101, and an intake pipe 104 for sending air cleaned by the air cleaner 102 into the internal combustion engine 101.

The intake pipe 104 is provided with a throttle valve 105 for controlling an output of the internal combustion engine 101 by adjusting the amount of intake air, and a fuel injection valve 106 for supplying fuel, whose amount is commensurate with the amount of intake air, into a cylinder.

The internal combustion engine 101 is provided with an exhaust pipe 107 for emitting exhaust gas generated by the combustion within a combustion chamber, and the exhaust pipe 107 is provided with an $O_2$ sensor 108 for detecting the amount of oxygen remaining in the exhaust gas and a three-way catalyst 109 for purifying hazardous gases in the exhaust gas.

Within the combustion chamber of the internal combustion engine 101, there is provided an ignition plug 130 that is driven by an ignition coil 131.

The ignition plug 130 generates a spark using a high-voltage energy supplied from the ignition coil 131, thereby burning a mixture within the combustion chamber.

The intake valve and the exhaust value of the internal combustion engine 101 are provided with a cam shaft 110 for setting valve timings for intake and exhaust in synchronism with a crank shaft 120. The cam shaft 110 is coupled to the crank shaft 120 through a mechanical transfer means such as a timing belt, and is rotated once when the crank shaft 120 makes two rotations.

A signal plate 111 that is attached to the cam shaft 110 to detect a cam angle is rotated integrally with the cam shaft 110. A cam angle sensor 112 provided for the intake valve of the internal combustion engine 101 detects the position (cam angle) of the cam shaft 110 by detecting protrusions of the signal plate 111 shown in FIG. 2, and also generates a cam shaft signal SGC.

Also, in each cylinder (#1 to #4), the signal plate 111 is provided with the protrusions so that the cam shaft signal SGC is generated at the instant when a piston within the cylinder is placed at a position that succeeds a top dead point by 135°CA (this position will be hereinafter referred to as the "B135").

It should be noted here that in the cylinder #3 and the cylinder #4, the signal plate 111 is provided with the protrusions so that the cam shaft signal SGC is also generated at B95. With this construction, the cylinders are distinguished from each other using the cam shaft signal SGC for each cylinder.

Also, in FIG. 3, a signal plate 121 that is attached to the crank shaft 120 to detect a crank angle is rotated integrally with the crank shaft 120. A crank angle sensor 122 detects a position (crank angle) of the crank shaft 120 by detecting protrusions of the plate signal 121, and generates a crank shaft signal SGT.

Also, the protrusions of the signal plate 121 for detecting the crank angle are provided at intervals of 10°CA. However, teeth at the position of B95 in each cylinder and at the position of B105 in the #2 cylinder and the #3 cylinder are removed in order to specify the position of B75 and distinguish each cylinder.

A control unit 150 constructed using a microcomputer drives various kinds of actuators based on detection information from various kinds of sensors showing the operating state of the internal combustion engine 101 and performs control of the internal combustion engine 101.

As described above, the detection information of respective kinds of sensors is entirely inputted into the control unit 150 and various kinds of control is performed under the control of the control unit 150.

Figure 4:
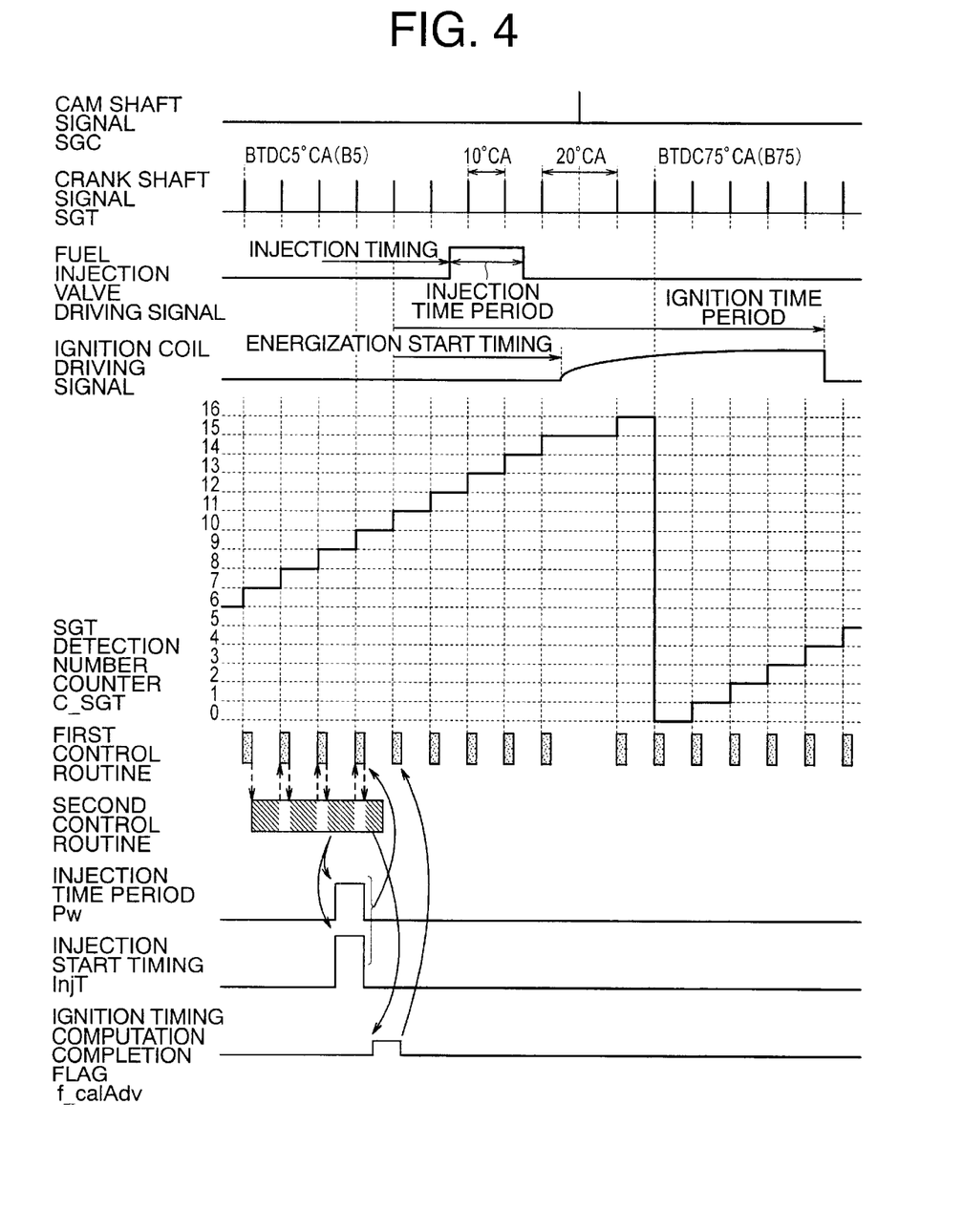
FIG. 4 is a timing chart showing a controlled variable computing apparatus that computes a fuel injection amount and an ignition timing under a normal operating state of the four-cylinder internal combustion engine.
Figure 5:
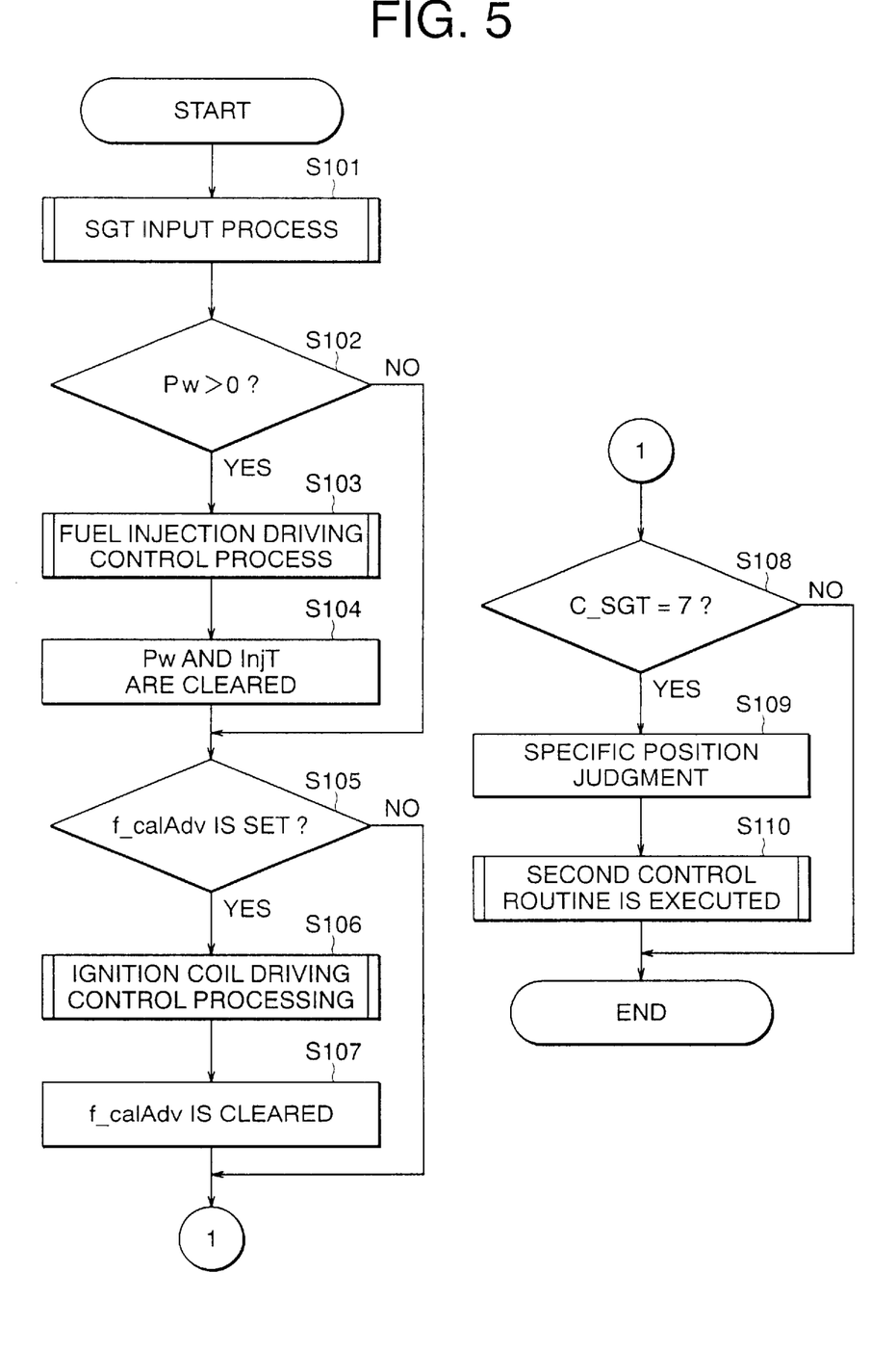
FIG. 5 is a flowchart showing a first control routine executed when a crank shaft signal SGT is inputted.
Figure 6:
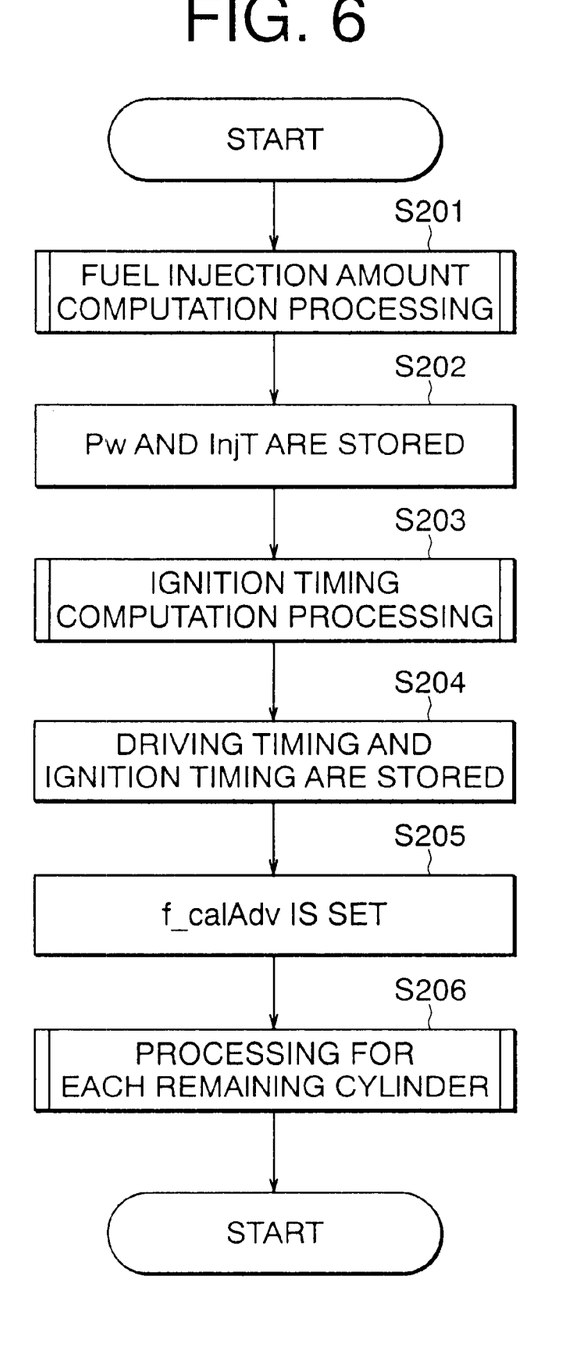
FIG. 6 is a flowchart showing a second control routine executed when specific position judgment is performed.

FIG. 4 is a timing chart showing a controlled variable computing apparatus where there are computed a fuel injection amount and an ignition timing under a normal operating state of the four-cylinder internal combustion engine. Also, FIG. 5 is a flowchart showing a first control routine (driving control means) that is executed each time the crank shaft signal SGT is inputted. FIG. 6 is a flowchart showing a second control routine (controlled variable computing means) that is executed when specific position judgment is performed.

It should be noted here that the first control routine is constructed from fuel injection driving control processing and ignition coil driving control processing, while the second control routine is constructed from fuel injection amount computation processing and injection timing computation processing.

Next, an operation according to the first embodiment of the present invention will be described with reference to FIGS. 4 to 6.

In FIG. 4, the crank angle sensor 122 detects the protrusions of the signal plate 121 that are provided at intervals of 10°CA. When the crank shaft signal SGT is outputted to the control unit 150, the control unit 150 starts the first control routine.

In FIG. 5, first, a SGT detection number counter C_SGT is counted up and there is counted the number of times of input of the crank shaft signal SGT.

On the other hand, in the case where B75 is detected through the toothless portion of the signal plate 121, the SGT detection number counter C_SGT is reset to "0" (see FIG. 4) (step S101).

Following this, it is judged whether a value of a fuel injection time period Pw is greater than "0" (step S102).

In the case where it has been judged that the value of the fuel injection time period Pw is greater than "0" in step S102 (that is, in the case of YES), it is judged that the fuel injection amount computation processing within the second control routine to be described later is completed and there is performed the fuel injection driving control processing (step S103).

Also, in the case where the value of the fuel injection time period Pw is equal to or smaller than "0" (that is, in the case of NO), it is judged that the fuel injection amount computation is not yet completed, and the driving computation for the fuel injection valve 106 is not performed by skipping steps S103 and S104.

In step S103, during the fuel injection driving control processing, a current crank angle is checked on the basis of the valve of the SGT detection number counter C_SGT, this current crank angle is compared with an injection start timing Inj_T computed in the second control routine; there is computed the degree of a crank angle until the start of injection, and an angle with a degree that cannot be judged only with an angle of the input timing of the crank shaft signal SGT is converted into a time period.

For instance, in FIG. 4, if the injection start timing Inj_T computed in the second control routine to be described later is 55°CA, this means that a driving signal for driving the fuel injection value 106 should be turned on after 55°CA from the B5 position (after 5CA after the value of the SGT detection number counter C_SGT becomes "12").

First, when the fuel injection amount computation processing in the second control routine is ended, there is received the injection start timing Inj_T when the value of the SGT detection number counter C_SGT becomes "10" in the first control routine.

Then, there is checked the current count number of the SGT detection number counter C_SGT whose value is counted up per 10°CA, and there is computed an angle remaining until the start of injection. In FIG. 4, the remaining angle is 25°CA.

After the counting for 20°CA is performed, when the value of the SGT detection number counter C_SGT becomes "12", it becomes impossible to discriminate the remaining 5°CA using the crank signal. Therefore, the remaining 5°CA is converted into a time period and the driving signal is turned on when the time period corresponding to 5°CA has elapsed.

The control unit 150 stores the time period until the start of injection and the injection time period Pw, turns on the driving signal when the driving should be started, and turns off the driving signal when the injection time period Pw has elapsed.

After an angle and a time period until the start of driving are computed, the fuel injection time period Pw and the injection start timing Inj_T are cleared to "0" (step S104).

Following this, it is judged whether an injection timing computation completion flag f_calAdv showing the completion of the injection timing computation processing in the second control routine to be described later is placed in an ON state (step S105).

In step S105, in the case where the injection timing computation completion flag f_calAdv is in the ON state (is set) (that is, in the case of YES), it is judged that the injection timing computation processing is completed and there is performed an ignition coil driving control processing (step S106).

On the other hand, in the case where the ignition timing computation completion flag f_calAdv is placed in an OFF state (is reset) (that is, in the case of NO), it is judged that the injection timing computation processing is not yet completed and the driving computation for the ignition coil 131 is not performed by skipping steps S106 and S107.

Like in the fuel injection driving control processing, during the ignition coil driving control processing, a current crank angle is checked on the basis of the value of the SGT detection number counter C_SGT, this current crank angle is compared with a driving timing (energization start timing) and an ignition timing computed in the second control routine; there is computed the degree of a crank angle until the start of energization and the ignition timing, and an angle with a degree that cannot be judged only with an angle of the input timing of the crank shaft signal SGT is converted into a time period.

The control unit 150 stores a time period until the start of energization and ignition, turns on the driving signal for the ignition coil 131 after the computed time period has elapsed, and turns off the driving signal when there is reached the ignition timing, thereby having the ignition plug perform spark discharge to burn a mixture in the combustion chamber.

It should be noted here that in FIG. 4, the ignition timing computation processing is completed at a timing at which the value of the SGT detection number counter C_SGT is "11" and the ignition timing computation completion flag f_calAdv is placed in the ON state to show that the computation is completed.

Also, in the case where the computation in step S106 is ended, the ignition timing computation completion flag f_calAdv is cleared (turned off) (step S107).

Following this, on the basis of the SGT detection number counter C_SGT, it is judged whether the current position is a specific position at which the execution of the second control routine in step S110 to be described later should be started (step S108).

In FIG. 4, it is judged that a timing, at which the value of the SGT detection number counter C_SGT is "7", is the specific position (step S109). At this timing, there is executed the second control routine in FIG. 6 (step S110) and the processing routine in FIG. 5 is ended.

Accordingly, the second control routine is executed in periods of 180°CA and its execution position becomes a position of B5.

Next, the second control routine to be executed when the specific position judgment is performed will be described.

It should be noted here that in FIG. 4, in the case where the first control routine is started, the processing in the second control routine is suspended until the first control routine is ended.

In FIG. 6, there is first executed the fuel injection amount computation processing. This fuel injection amount computation processing is generally performed. For instance, on the basis of a state amount, such as an intake air amount, of the internal combustion engine 101, a fuel injection amount and the like are computed using data and the like prestored in the control unit 150 and the fuel injection time period Pw and the injection start timing Inj__T are computed from the fuel injection amount and the like (step S201).

After the computation is completed, values of the injection time period Pw and the injection start timing Inj__T are stored in a memory (step S202). Because these values are stored in the memory, the driving control for the fuel injection valve 106 is performed using the latest computed values in the next first control routine.

Following this, the ignition timing computation processing is performed. Like the fuel injection amount computation processing, this ignition timing computation processing is generally performed. For instance, on the basis of a state amount of the internal combustion engine 101, an ignition coil driving timing (energization start timing) and an ignition timing are computed using data and the like prestored in the control unit 150 (step S203).

After the computation is completed, the ignition coil driving timing and the ignition timing are stored in a memory (step S204). Because the ignition coil driving timing and the ignition timing are stored in the memory, the driving control for the ignition coil 131 is performed using the latest computed values in the next first control routine.

Following this, the ignition timing computation completion flag f_calAdv is placed in an ON state, thereby showing that the ignition timing computation processing is completed (step S205).

Finally, there is performed processing for each cylinder, such as the driving control for a variable valve timing mechanism (VVT) (step S206), and the processing routine in FIG. 6 is ended.

As described above, a long time period is taken to compute the driving timings and driving time periods for the fuel injection valve 106 and the ignition coil 131. Consequently, the computation is performed at a specific timing and, after the computation is ended, the driving control for each control target is performed.

As described above, a large number of processes are performed in the second control routine, so that a time period taken to execute the second control routine becomes longer than a time interval between the input of the crank shaft signal SGT from each cylinder. Consequently, even if there is made attempt to perform the processing within a time interval between the input of the crank shaft signal SGT, there is a danger that the computation processing is not completed within the time interval between the input.

Accordingly, a control program is executed within a short interval of 10°CA or the like and the first control routine for driving the fuel injection valve 106, the ignition coil 131, and the like is separated from the second control routine that is not required to be executed within a short time period of 10°CA or the like. The first control routine is executed each time the crank shaft signal SGT is inputted, while the second control routine is executed to perform computation processing at a specific timing of the crank shaft signal SGT.

Also, while the first control routine is being executed, the second control routine is suspended.

That is, the control program stored in the control unit 150 is constructed such that the execution of the second control routine is given the lower order of precedence than the first control routine. Consequently, as shown in FIG. 4, the execution of the first control routine is given precedence when the crank shaft signal SGT is inputted.

As a result of this construction, it is not required to complete the processing in the second control routine within a time interval between the input of the crank shaft signal SGT. In addition, it becomes possible to execute the second control routine without disturbing the first control routine.

Also, it is possible to set the time intervals of generation of the crank shaft signal SGT from each cylinder as short and the completion of computation of controlled variables is monitored using a flag or the like. Consequently, the first control routine executed each time the crank shaft signal SGT is inputted is capable of using the computation results of the second control routine in the next first control routine. As a result, it becomes possible to realize control with good responsiveness synchronized with the revolution of the internal combustion engine without complicating the construction of the control program.

It should be noted here that in FIG. 4, the second control routine constructed from the fuel injection amount computation processing and the ignition timing computation processing is executed at a single specific position. However, this second control routine may be divided and executed at a plurality of positions.

For instance, the fuel injection amount computation processing may be executed at a timing (B5) at which the value of SGT detection number counter C_SGT becomes "7", and the ignition timing computation processing may be executed at a timing (B75) at which the value of the SGT detection number counter C_SGT becomes "0". In this case, it becomes possible to realize control with better responsiveness.

It should be noted here that as to an angle with reference to which there is generated the crank shaft signal SGT, protrusions are provided for the signal plate 121 at intervals of 10°CA. However, there may be used an arbitrary angle such as 5°CA, for instance.

Also, in this embodiment, there has been described a four-cylinder internal combustion engine, although the present invention is also applicable to an internal combustion engine having cylinders whose number is not four.

Second Embodiment

It should be noted here that in the first embodiment described above, the second control routine is executed at a specific timing of the crank shaft signal. However, this second control routine may be executed using the cam shaft signal.

Figure 7:
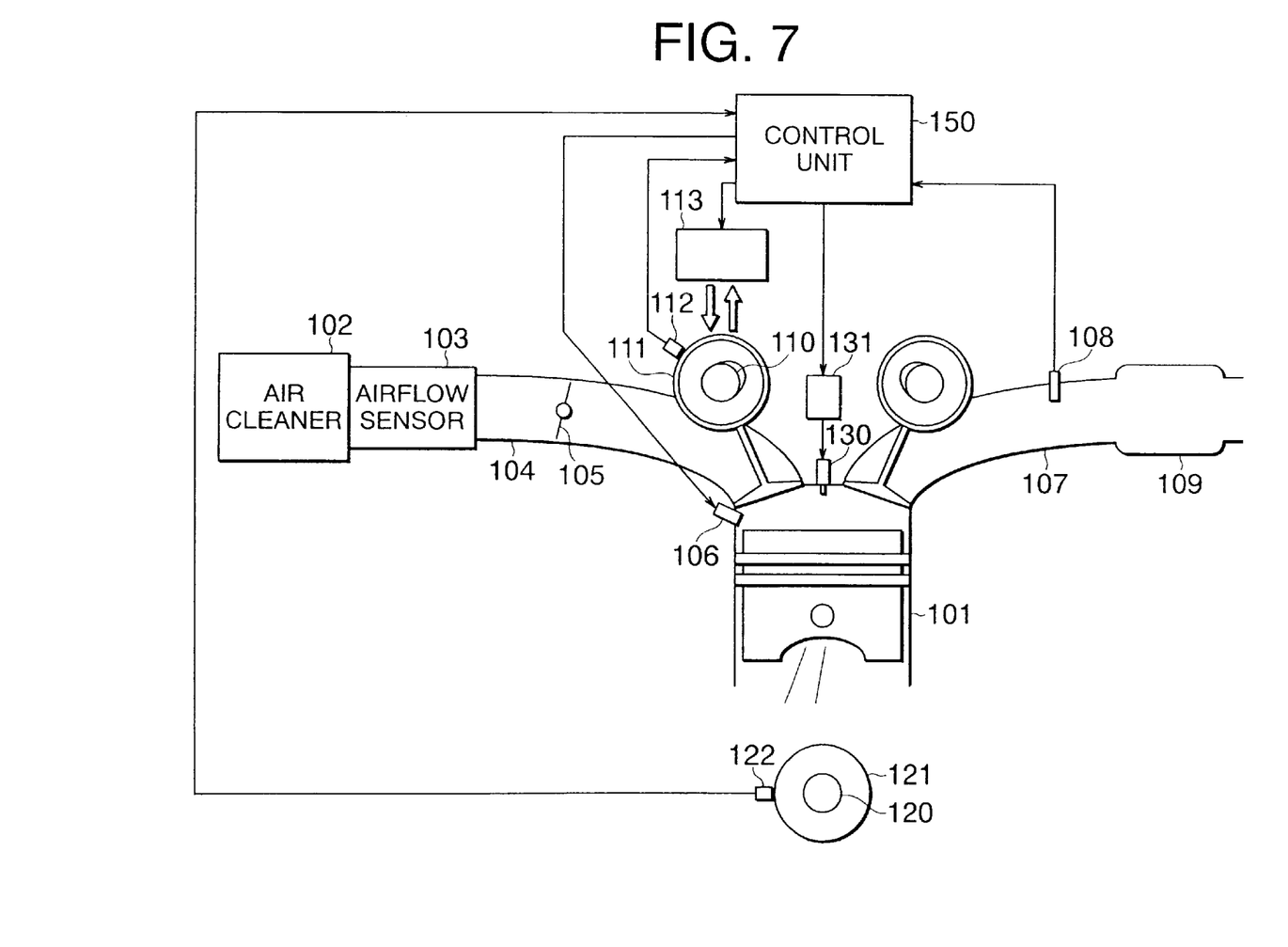
FIG. 7 is a construction drawing showing a four-cylinder internal combustion engine provided with a variable valve timing mechanism in a second embodiment of the present invention.
Figure 8:
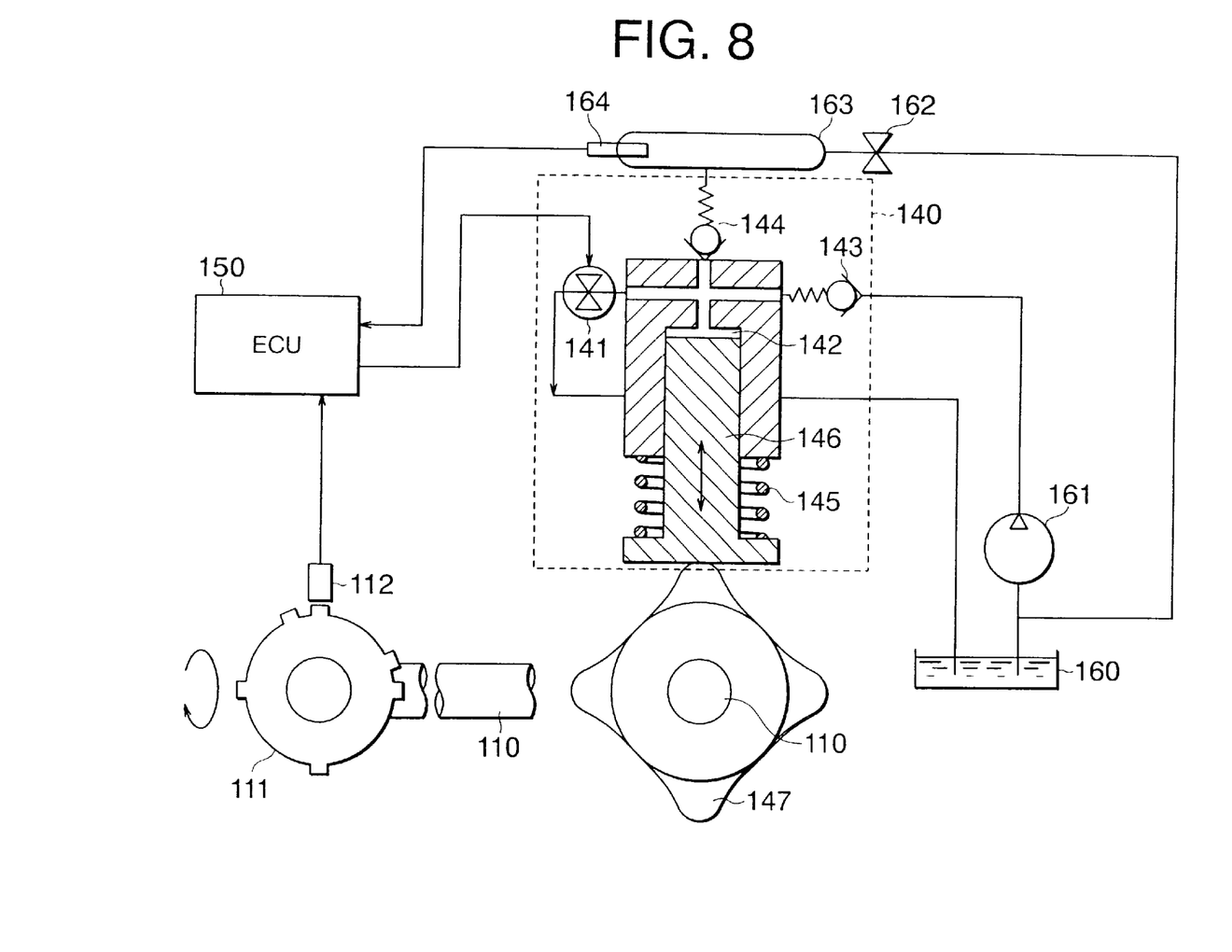
FIG. 8 is a construction drawing showing a portion around a high-pressure pump attached to a cam shaft.

FIG. 7 is a construction drawing showing a four-cylinder internal combustion engine in a second embodiment of the present invention that is provided with a variable valve timing mechanism (hereinafter referred to as the "VVT"). FIG. 8 is a construction drawing showing a portion around a high-pressure pump attached to a cam shaft. Note that in FIGS. 7 and 8, the same constructions as those described above (FIGS. 1 to 3) are given the same reference numerals and the description thereof will be omitted.

In FIG. 7, a VVT 113 is provided on an intake valve side of the internal combustion engine 101. Also, in FIG. 8, a cam shaft 110 on the intake side is provided with a high-pressure pump 140, and this high-pressure pump 140 is driven for each cylinder through the pushing-up of a piston 145 by a pump cam 146 interlocked with the cam shaft 110.

Next, how the high-pressure pump 140 operates will be described with reference to FIG. 8.

In FIG. 8, a low-pressure pump 161 opens a check valve 143 within the high-pressure pump 140, thereby having fuel in a fuel tank 160 flow into a combustion chamber 142 within the high-pressure pump 140.

A pump cam 147 that is rotated through the interlocking with the cam shaft 110 operates a piston 146, on whose outer region there is provided a spring 145, upwardly and downwardly, thereby increasing the fuel pressure within the high-pressure pump 140.

The fuel, whose pressure is increased, opens the check valve 144, is discharged into a delivery pipe 163, and is injected by a fuel injection valve.

At a timing when the cam angle sensor 112 detects a protrusion of the signal plate 112, the control unit 150 computes a controlled variable for the pressure so that a pressure value becomes a target pressure, based on the pressure value from a fuel pressure sensor 164 and a target pressure during fuel injection. In this manner, the control unit 150 determines the amount of fuel discharged into the delivery pipe 163.

When a controlled variable for the pressure is computed, there are computed a driving timing and a driving time period for an electromagnetic valve 141 and the electromagnetic valve 141 is opened or closed (is driven), thereby controlling the amount of fuel discharged into the delivery pipe 163 and the pressure value. In the case where the electromagnetic valve 141 is opened, the fuel flows into the fuel tank 160 through a fuel chamber 142 and the electromagnetic valve 141.

Also, by opening a relief valve 162, the fuel within the delivery pipe 163 flows into the fuel tank 160.

Figure 9:
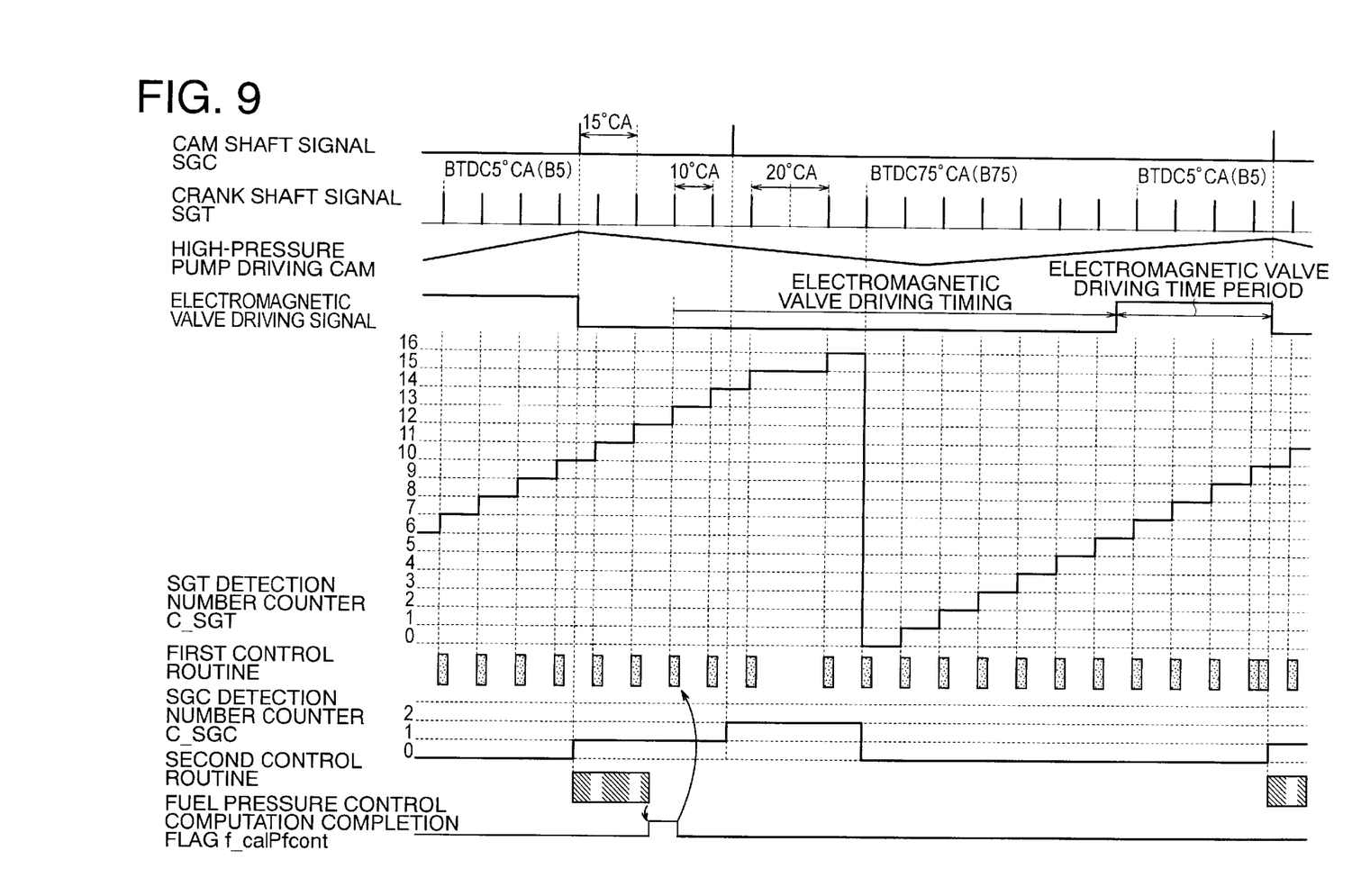
FIG. 9 is a timing chart showing fuel pressure control under a normal operating state where the VVT in the four-cylinder internal combustion engine makes a spark advance of 15°.

FIG. 9 is a timing chart showing fuel pressure control under a normal operating state where the VVT within the four-cylinder internal combustion engine makes a spark advance of 15°.

Figure 10:
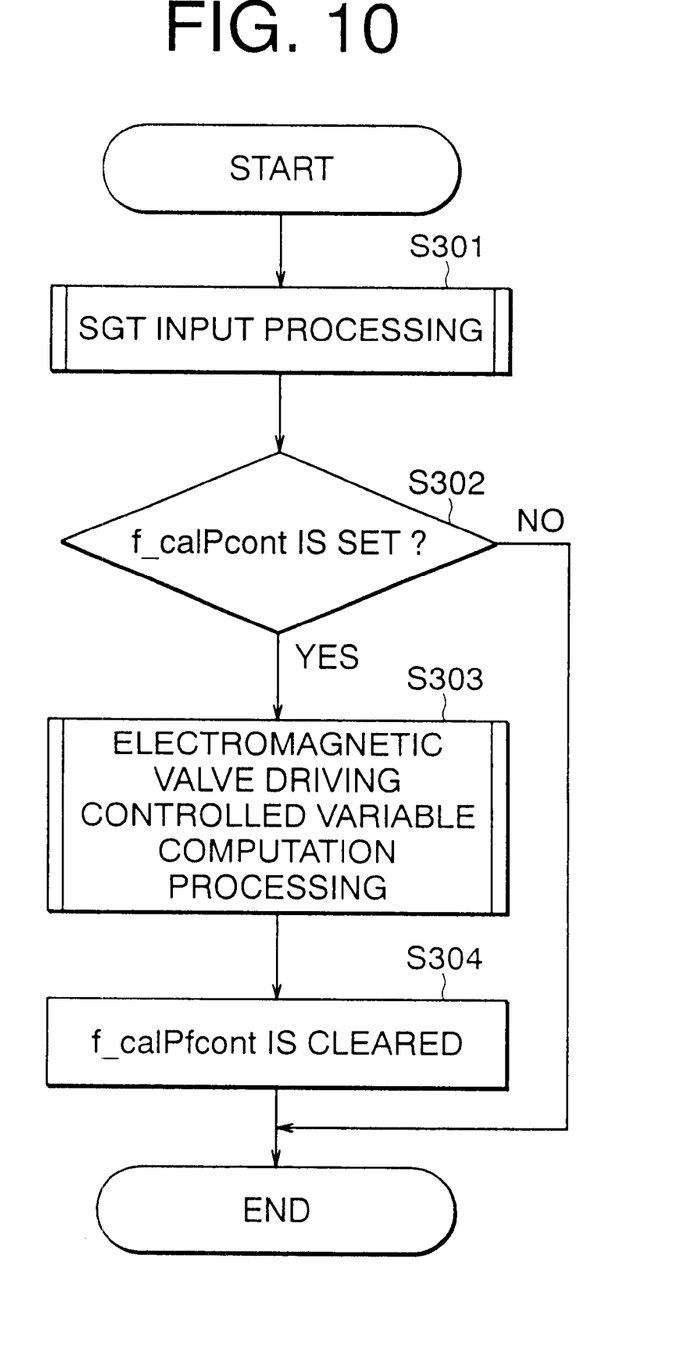
FIG. 10 is a flowchart showing the first control routine executed when a cam shaft signal SGT is inputted.
Figure 11:
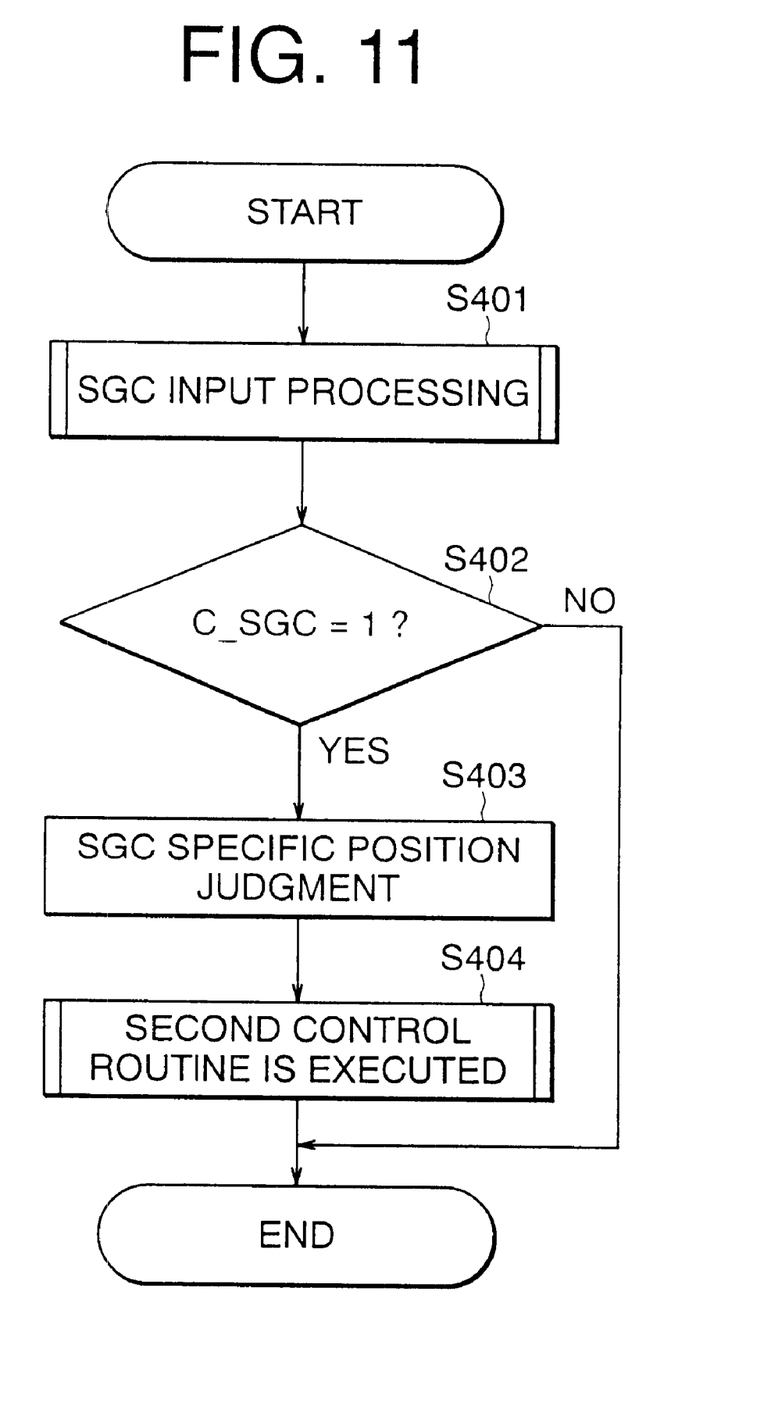
FIG. 11 is a flowchart showing the second control routine executed when a crank shaft signal SGC is inputted.
Figure 12:
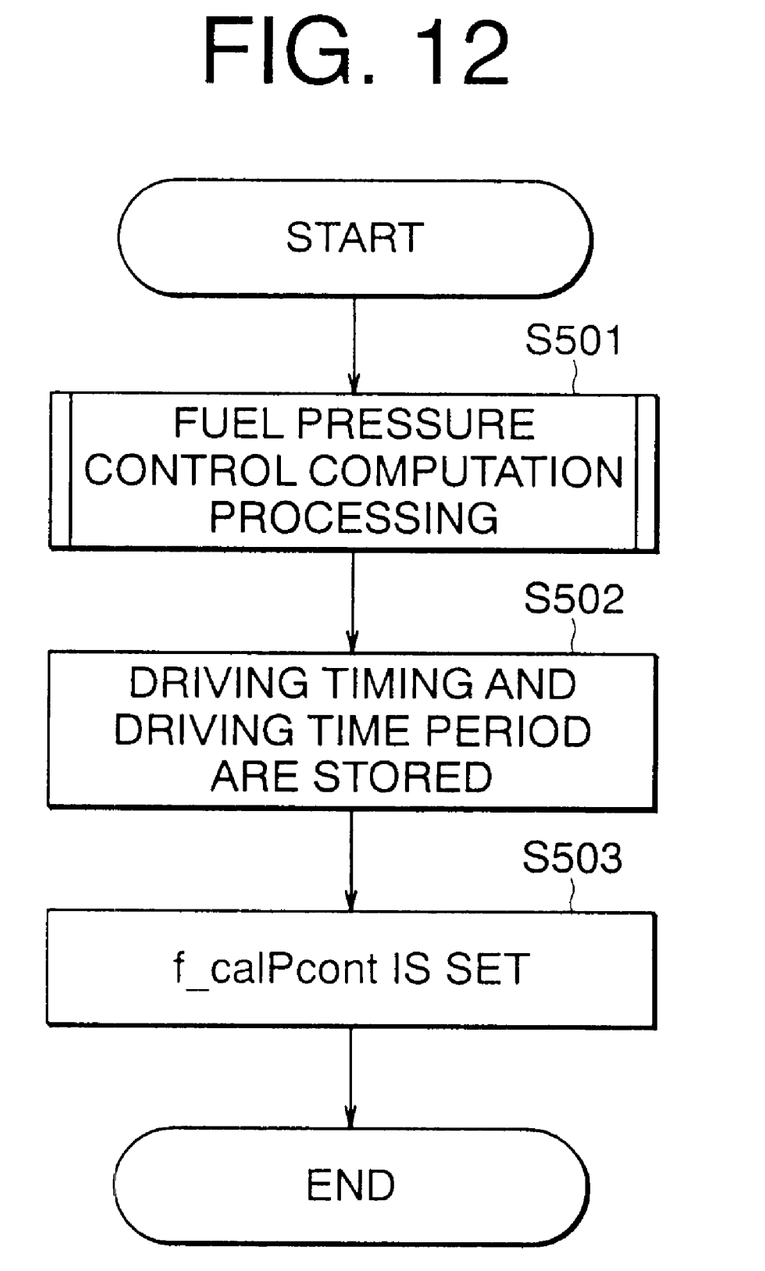
FIG. 12 is a flowchart showing the second control routine executed when a specific crank shaft signal SGC is inputted.

FIG. 10 is a flowchart showing the first control routine that is executed when the cam shaft signal SGT is inputted. FIG. 11 is a flowchart showing the second control routine that is executed when the crank shaft signal SGC is inputted. FIG. 12 is a flowchart showing the second control routine that is executed when the specific crank shaft signal SGC is inputted.

It should be noted here that the first control routine is constructed from an electromagnetic valve driving controlled variable computation processing, while the second control routine is constructed from a fuel pressure control computation processing.

Next, an operation in the second embodiment of the present invention will be described. First, the processing during the input of the crank shaft signal SGT will be described with reference to FIGS. 9 and 10.

The crank angle sensor 122 detects the protrusions of the signal plate 121 that are provided at intervals of 10°CA. When the crank shaft signal SGT is outputted to the control unit 150, the control unit 150 counts up a SGT detection number counter C_SGT.

Also, in the case where B75 is detected through the toothless portion of the signal plate 121, the SGT detection number counter C_SGT is reset to "0"(see FIG. 9) (step S301).

Following this, it is judged whether a fuel pressure control computation completion flag f_calPfcont is placed in an ON state (is set) (step S302).

In the case where it is judged that the fuel pressure control computation completion flag f_calPfcont is in the ON state (that is, in the case of YES) in step S302, it is judged that the fuel pressure control computation in the second control routine to be described later is completed and there is performed an electromagnetic valve driving controlled variable computation processing (step S303).

On the other hand, in the case where it is judged that the fuel pressure control computation completion flag f_calPfcont is in an OFF state (that is, in the case of NO), it is judged that the fuel pressure control computation is not yet completed, so that the processing routine in FIG. 10 is ended without performing the driving control for the electromagnetic valve 141 by skipping steps S303 and S304.

Like in the fuel injection driving control processing, during the electromagnetic valve driving control processing, a current crank angle is checked on the basis of the value of the SGT detection number counter C_SGT, this current crank angle is compared with a driving timing computed in the second control routine; there is computed the degree of a crank angle until the start of driving, and an angle with a degree that cannot be judged only with an angle between the input of the crank shaft signal SGT is converted into a time period.

The control unit 150 stores a time period until the start of driving and a driving time period. When a computed time period has elapsed, a signal for driving the electromagnetic valve 141 is turned on for the driving time period. When the driving time period has elapsed, the driving signal is turned off.

In FIG. 9, when the value of the SGT detection number counter C_SGT becomes "13", the fuel pressure control computation completion flag f_calPfcont is placed in an ON state. At this timing, the driving control for the electromagnetic valve 141 is performed using the latest computed value obtained as a result of the fuel pressure control computation.

When the computation in step S303 is finished, the fuel pressure control computation completion flag f_calPfcont is cleared to an OFF state (step S304) and the processing routine in FIG. 10 is ended.

Next, the processing during the input of the cam shaft signal SGC will be described with reference to FIGS. 9 and 11.

The cam angle sensor 112 detects the protrusions of the signal plate 111. When the cam shaft signal SGC is outputted to the control unit 150, the control unit 150 counts up a SGC detection number counter C_SGC and counts the number of times of input of the cam shaft signal SGC.

Also, in the case where B75 is detected through the toothless portion of the signal plate 121, the SGC detection number counter C_SGC is reset to "0"(see FIG. 9) (step S401) in the same manner as in SGT detection number counter C_SGT.

Following this, it is judged whether the value of the SGC detection number counter C_SGC is "1" (step S402).

In step S402, in the case where the value of the SGC detection number counter C_SGC is "1" (that is, in the case of YES), it is judged that the current position is a specific position at which the second control routine should be started (step S403). Consequently, there is executed the second control routine (step S404).

In FIG. 9, when the value of the SGC detection number counter C_SGC is "1", it is judged that the current position is the specific position and there is executed the second control routine.

Next, the second control routine that is carried out during specific position judgment will be described with reference to FIG. 12.

It should be noted here that as shown in FIG. 9, in the case where the first control routine is started, the processing in the second control routine is suspended until the first control routine is ended.

First, there is carried out fuel pressure control computation processing. During this fuel pressure control computation processing, for instance, a target fuel pressure is calculated using data and the like prestored in the control unit 150 on the basis of a state amount of the internal combustion engine 101, and a driving timing and a driving time period for the electromagnetic valve 141 within the high-pressure pump 140 are computed so that there is obtained the calculated fuel pressure (step S501).

When the computation is completed, the electromagnetic valve driving timing and the driving time period are stored in a memory within the control unit 150 (step S502).

When the computation is completed and its computed value is stored in the memory, the fuel pressure control computation completion flag f_calPfcont showing that the computation is completed is placed in an ON state (step S503) and the processing routine in FIG. 12 is ended.

In the next first control routine, it is possible to drive the electromagnetic valve 141 by performing driving control processing using the latest electromagnetic valve driving timing and driving time period stored in the memory.

As described above, in the second control routine, processing is performed using the cam shaft signal SGC as a trigger and a time period from the input of the cam shaft signal SGC to the input of the crank shaft signal SGT does not remain constant, so that there may be conceived a case where the processing in the second control routine is not completed before the input of the crank shaft signal SGT.

Accordingly, as to the electromagnetic valve driving timing, the driving time period, and the like, computation processing is performed at a specific timing of the cam shaft signal SGC. In order to make it possible to apply the electromagnetic valve driving timing, the driving time period, and the like to the driving control processing immediately after the computation processing is ended, the driving control processing is performed within a time interval between the input of the crank shaft signal SGT whose input intervals are short.

It should be noted here that while the electromagnetic valve driving controlled variable computation processing is being executed, there is not performed the processing for computing the electromagnetic valve driving timing and the driving time period.

That is, the control program stored in the control unit 150 is constructed so that the execution of the second control routine is given the lower order of precedence than the first control routine. Consequently, as shown in FIG. 9, the execution of the first control routine is given precedence when the crank shaft signal SGT is inputted.

Therefore, it is not required to complete the processing in the second control routine within a time interval between the input of the cam shaft signal SGC. In addition, it becomes possible to execute the second control routine without disturbing the first control routine.

Also, the control is performed in accordance with the changing of the position of the pump cam 146 for driving the high-pressure pump by the VVT, so that it becomes unnecessary to pay attention to the changing due to the VVT. As a result, it becomes possible to simplify the control program.

It should be noted here that in FIG. 9, there is shown fuel pressure control within the internal combustion engine provided with the VVT. However, the present invention is not limited to this and is also applicable to different control.

Also, a toothless portion is used as a reference position of the crank shaft signal SGT, although there may be additionally used a different signal.

Also, the second control routine is executed at a specific input timing of the cam shaft signal SGC, although the second control routine may be executed at a plurality of timings.

Also, in this embodiment, there has been described a four-cylinder internal combustion engine. However, the present invention is also applicable to an internal combustion engine having cylinders whose number is not four.

As has been described above, according to the present invention, there is provided the controlled variable computing apparatus for the internal combustion engine including, a revolution signal generating unit for outputting the revolution signal in synchronism with revolution of the internal combustion engine each time revolution by the predetermined angle is made, and a control unit for computing the controlled variable for the control target of the internal combustion engine each time the revolution signal is inputted, in which the control unit includes, a controlled variable computing unit for computing the driving timing and the driving time period for the control target at a point in time when the number of times of input of the revolution signal reaches the predetermined number, and the driving control unit for controlling the driving of the control target based on the driving timing and the driving time period each time the revolution signal is inputted, in which if the operation time period of the controlled variable computing unit overlaps the operation time period of the driving control unit, the driving control unit is prioritized to perform its operation by suspending an operation of the controlled variable computing unit. Therefore, there is an effect such that the controlled variable computing apparatus for the internal combustion engine is obtained in which it is unnecessary to complete the operation of the controlled variable computing unit within a time period between signals synchronized with the revolution, there is not hindered the operation of the driving control unit, and it is possible to carry out control with good responsiveness while preventing a situation where the control program is complicated.

Also, with the technique of the present invention, the revolution signal generating unit outputs the revolution signal in synchronism with rotation of a crank shaft of the internal combustion engine. This construction achieves an effect that it becomes possible to obtain a controlled variable computing apparatus for an internal combustion engine that is capable of performing control in accordance with a crank angle and performing control with good responsiveness.

Also, with the technique of the present invention, the revolution signal generating unit includes, a crank shaft signal generating unit for outputting a crank shaft signal synchronized with rotation of a crank shaft of the internal combustion engine, and a cam shaft signal generating unit for outputting a cam shaft signal synchronized with rotation of a cam shaft of the internal combustion engine. Also, the controlled variable computing unit computes the driving timing and the driving time period for the control target at a point in time when the cam shaft signal is inputted. Further, the driving control unit controls driving of the control target based on the driving timing and the driving time period each time the crank shaft signal is inputted. This construction achieves an effect that it becomes possible to obtain a controlled variable computing apparatus for an internal combustion engine that is capable of preventing a situation where there is hindered an operation of the driving control unit when there is performed control synchronized with the rotation of the cam shaft.

Also, with the technique of the present invention, the controlled variable computing unit carries out the computation at a point in time when the number of times of input of the cam shaft signal reaches a predetermined number. This construction realizes an effect that it becomes possible to obtain a controlled variable computing apparatus for an internal combustion engine that is capable of performing control in accordance with a cam angle and is not required to include a plurality of unit for generating a cam shaft signal because a value obtained by counting the cam shaft signal is, for instance, applied to the discrimination between cylinders as well as to the operation timing of the controlled variable computing unit.

Also, with the technique of the present invention, the controlled variable computing unit computes controlled variables for a plurality of control targets and, at a point in time when the computation of the controlled variable for each control target is completed, notifies the driving control unit of the completion of the computation. Also, the driving control unit performs control of driving of the control target corresponding to the notification of the completion of the computation based on the controlled variable. This construction realizes an effect that it becomes possible to obtain a controlled variable computing apparatus for an internal combustion engine that is capable of realizing control with good responsiveness because it is possible to, irrespective of whether the computation by the controlled variable computing unit is entirely completed, apply each value that has been computed to the operation of the immediately succeeding driving control unit.

Also, with the technique of the present invention, the controlled variable computing unit computes an injection timing for a fuel injection valve which is provided for a cylinder of the internal combustion engine and that injects fuel into the cylinder, and an injection time period during which the fuel is injected. Also, the driving control unit controls driving of the fuel injection valve based on the injection timing and the injection time period. This construction realizes an effect that it becomes possible to obtain a controlled variable computing apparatus for an internal combustion engine that is capable of realizing control with good responsiveness because it is possible to, irrespective of whether the computation by the controlled variable computing unit is entirely finished, apply a controlled variable for the fuel injection valve to the operation of the immediately succeeding driving control unit if the computation of the fuel injection amount is at least finished.

Also, with the technique of the present invention, the controlled variable computing unit computes an energization time period during which an ignition coil which is provided for a cylinder of the internal combustion engine, for igniting a mixture within the cylinder is energized, and an ignition time period during which the mixture is ignited. Also, the driving control unit controls driving of the ignition coil based on the energization time period and the ignition time period. This construction realizes an effect that it becomes possible to obtain a controlled variable computing apparatus for an internal combustion engine that is capable of realizing control with good responsiveness because it is possible to apply the controlled variable for the ignition coil to the operation of the driving control unit that immediately succeeds the end of ignition timing computation processing.

Also, with the technique of the present invention, the controlled variable computing unit computes an electromagnetic value driving timing and an electromagnetic valve driving time period for a high-pressure pump that controls a fuel pressure to a predetermined value. Also, the driving control unit controls driving of the electromagnetic valve based on the electromagnetic valve driving timing and the electromagnetic valve driving time period. This construction realizes an effect that it becomes possible to obtain a controlled variable computing apparatus for an internal combustion engine that is capable of realizing control with good responsiveness because it is possible to apply the controlled variable for the electromagnetic valve to the operation of the driving control unit that immediately succeeds the end of the fuel pressure control computation processing.

Also, with the technique of the present invention, there is further included a variable valve timing unit for controlling rotation of the cam shaft of the internal combustion engine, where the high-pressure pump is driven in accordance with the rotation of the cam shaft and the cam shaft signal generating unit outputs the cam shaft signal in accordance with the rotation of the cam shaft controlled by the variable valve timing unit. This construction realizes an effect that it becomes possible to obtain a controlled variable computing apparatus for an internal combustion engine that eliminates the necessity to create a control program by paying attention to the operation of the variable valve timing unit and makes it possible to perform control synchronized with the revolution of the internal combustion engine and to simplify the control program. This is because the rotation of the cam shaft for driving the high-pressure pump is controlled by the variable valve timing unit, so that if there is performed control of the electromagnetic valve in accordance with the rotation of the cam shaft, this unit that there is performed control in accordance with the operation of the variable valve timing unit.

What is claimed is:

1. A controlled variable computing apparatus for an internal combustion engine, comprising:

revolution signal generating means for outputting a revolution signal in synchronism with revolution of said internal combustion engine each time revolution by a predetermined angle is made; and control means for computing a controlled variable for a control target of said internal combustion engine each time said revolution signal is inputted, wherein said control means includes:

controlled variable computing means for computing a driving timing and a driving time period for said control target at a point in time when the number of times of input of said revolution signal reaches a predetermined number; and driving control means for controlling the driving of said control target based on said driving timing and said driving time period each time said revolution signal is inputted, and wherein if the operation time period of said controlled variable computing means overlaps the operation time period of said driving control means, said driving control means is prioritized to perform its operation by suspending an operation of said controlled variable computing means.

2. A controlled variable computing apparatus for an internal combustion engine according to claim 1, wherein said revolution signal generating means outputs said revolution signal in synchronism with rotation of a crank shaft of said internal combustion engine.

3. A controlled variable computing apparatus for an internal combustion engine according to claim 1, wherein said revolution signal generating means includes:

crank shaft signal generating means for outputting a crank shaft signal synchronized with rotation of a crank shaft of said internal combustion engine; and cam shaft signal generating means for outputting a cam shaft signal synchronized with rotation of a cam shaft of said internal combustion engine, said controlled variable computing means computes said driving timing and said driving time period for said control target at a point in time when said cam shaft signal is inputted, and said driving control means controls driving of said control target based on said driving timing and said driving time period each time the crank shaft signal is inputted.

4. A controlled variable computing apparatus for an internal combustion engine according to claim 3, wherein said controlled variable computing means carries out the computation at a point in time when the number of times of input of said cam shaft signal reaches a predetermined number.

5. A controlled variable computing apparatus for an internal combustion engine according to claim 1, wherein said controlled variable computing means computes controlled variables for a plurality of control targets and, at a point in time when the computation of the controlled variable for each control target is completed, notifies said driving control means of the completion of the computation, and said driving control means performs control of driving of the control target corresponding to the notification of the completion of the computation based on said controlled variable.

6. A controlled variable computing apparatus for an internal combustion engine according to claim 1, wherein said controlled variable computing means computes an injection timing for a fuel injection valve which is provided for a cylinder of said internal combustion engine and that injects fuel into the cylinder, and an injection time period during which said fuel is injected, and said driving control means controls driving of said fuel injection valve based on said injection timing and said injection time period.

7. A controlled variable computing apparatus for an internal combustion engine according to claim 1, wherein said controlled variable computing means computes an energization time period during which an ignition coil which is provided for a cylinder of said internal combustion engine, for igniting a mixture within the cylinder is energized, and an ignition time period during which said mixture is ignited, and said driving control means controls driving of said ignition coil based on said energization time period and said ignition time period.

8. A controlled variable computing apparatus for an internal combustion engine according to claim 1, wherein said controlled variable computing means computes an electromagnetic valve driving timing and an electromagnetic valve driving time period for a high-pressure pump that controls a fuel pressure to a predetermined value, and said driving control means controls driving of said electromagnetic valve based on said electromagnetic valve driving timing and said electromagnetic valve driving time period.

9. A controlled variable computing apparatus for an internal combustion engine according to claim 8, further comprising:

variable valve timing means for controlling the rotation of the cam shaft of said internal combustion engine, wherein said high-pressure pump is driven in accordance with the rotation of said cam shaft, and said cam shaft signal generating means outputs the cam shaft signal in accordance with the rotation of the cam shaft controlled by said variable valve timing means.

* * * * *